United States Patent [19]

Wilkinson

[11] 4,118,735
[45] Oct. 3, 1978

[54] SYNCHRONOUS DETECTION TRACKING OF VIDEO DISC

[75] Inventor: Richard L. Wilkinson, Torrance, Calif.

[73] Assignee: MCA Disco-Vision, Inc., Los Angeles, Calif.

[21] Appl. No.: 766,928

[22] Filed: Feb. 9, 1977

Related U.S. Application Data

[63] Continuation of Ser. No. 510,163, Sep. 30, 1974, abandoned.

[51] Int. Cl.² ............................................... H04N 5/76
[52] U.S. Cl. ............................ 358/128; 179/100.3 G; 179/100.3 V; 365/124
[58] Field of Search ................. 358/128; 179/100.3 V; 340/173 LM, 173 LT; 250/201, 202, 203 R; 360/77; 365/120, 124

[56] References Cited

U.S. PATENT DOCUMENTS

| | | | |
|---|---|---|---|
| 2,851,521 | 9/1958 | Clapp | 179/100.3 V |
| 3,126,535 | 3/1964 | Streeter | 360/77 |
| 3,624,284 | 11/1971 | Russell | 179/100.3 V |
| 3,673,412 | 6/1972 | Olson | 179/100.3 V |
| 3,829,622 | 8/1974 | Elliot | 179/100.3 V |
| 3,848,095 | 11/1974 | Wohlmut et al. | 358/128 |
| 3,854,015 | 12/1974 | Janssen | 170/100.3 V |
| 3,914,541 | 10/1975 | Elliott | 179/100.3 V |
| 3,952,191 | 4/1976 | Tinet | 170/100.3 V |
| 3,985,952 | 10/1976 | Adler | 179/100.3 V |

OTHER PUBLICATIONS

Compaan et al., The Philips 'VLP' System, Philips Tech. Rev. 33, 178–180, 10/73, No. 7.
Ahrendt et al., Servomechanism Practice, McGraw–Hill Book Co., 1960, pp. 120–124 and 167.

Primary Examiner—Raymond F. Cardillo, Jr.
Attorney, Agent, or Firm—Ronald J. Clark

[57] ABSTRACT

A videodisc system utilizes a beam of light which tracks the center of an interrupted spiral information channel. The light beam is "dithered" from side to side of the channel in order to determine the relative "direction" of a beam deviating from the center of the channel. The beam oscillates by approximately one-third of the width of the channel. By multiplying the returned signal by the drive signal, a signal is derived whose mean value is positive on one side of the track, negative on the other side and zero when in the center of the track.

2 Claims, 7 Drawing Figures

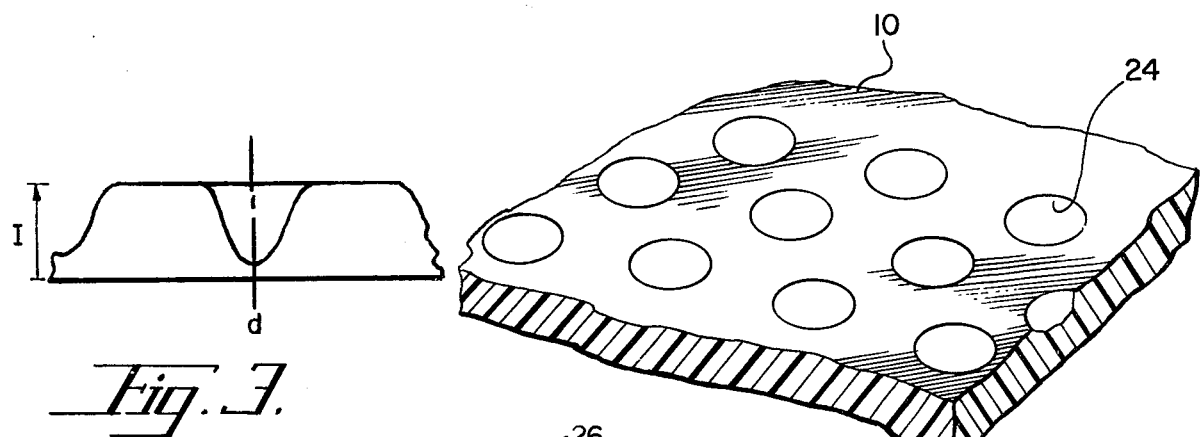
Fig. 3.
Fig. 2.
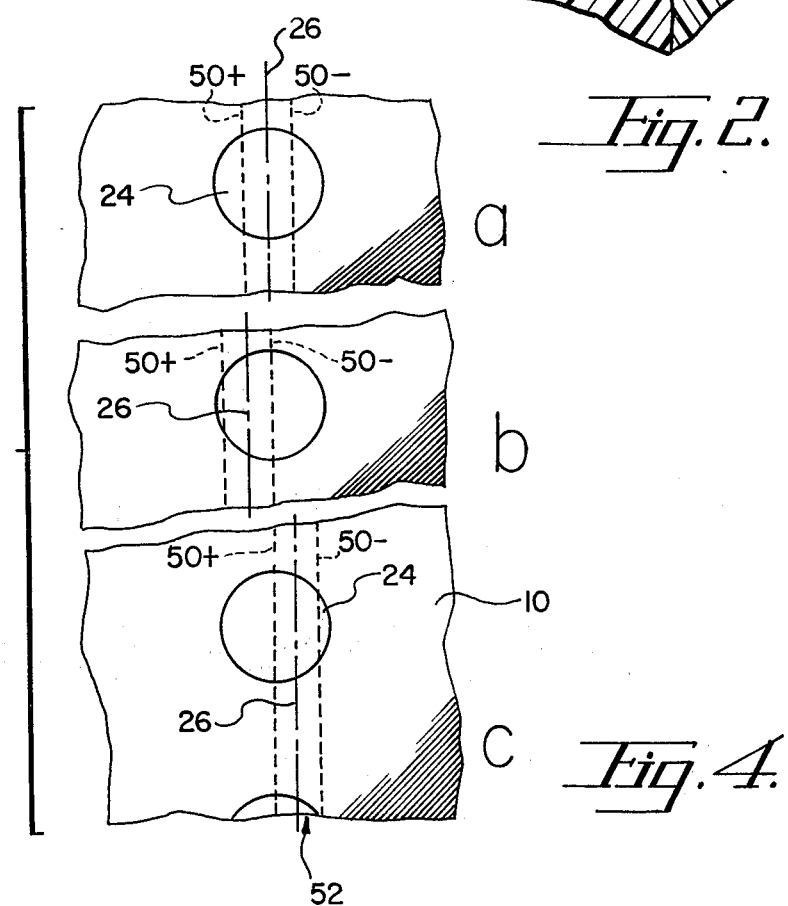
Fig. 4.
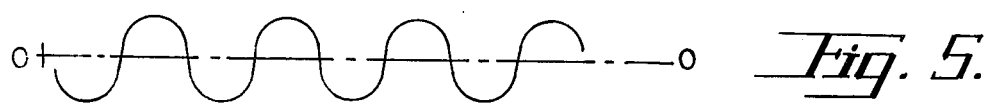
Fig. 5.
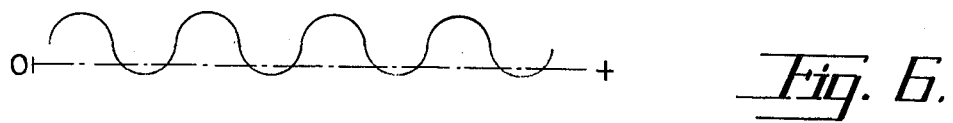
Fig. 6.
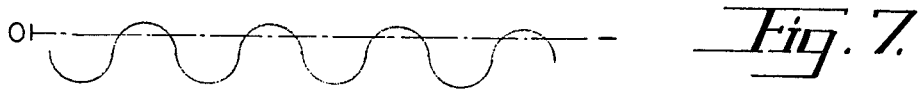
Fig. 7.

SYNCHRONOUS DETECTION TRACKING OF VIDEO DISC

This is a continuation of application Ser. No. 510,163, filed Sept. 30, 1974, now abandoned.

RELATED PATENTS AND PATENT APPLICATIONS

Issued Patents

"Photoelectric Transducer Head" by David P. Gregg, U.S. Pat. No. 3,349,273, issued Oct. 24, 1967;

"Transparent Recording Disc" by David P. Gregg, U.S. Pat. No. 3,430,966, issued Mar. 4, 1969;

"Video Disc Playback Assembly" by Keith O. Johnson, U.S. Pat. No. 3,518,442, issued June 30, 1970;

"Video Signal Transducer Having Servo Controlled Flexible Fiber Optic Track Centering" by David P. Gregg and Keith O. Johnson, U.S. Pat. No. 3,530,258 issued Sept. 22, 1970;

"Duplicating Process for Video Disc Records" by Kent D. Broadbent, U.S. Pat. No. 3,658,954, issued Apr. 25, 1972;

"Duplicating Process for Video Disc Records" by Kent D. Broadbent, U.S. Pat. No. 3,687,664, issued Aug. 29, 1972;

"Articulated Mirror" by James E. Elliott, U.S. Pat. No. 3,794,410, issued Feb. 26, 1974;

"Video Recording and Reproducing System" by Kent D. Broadbent, U.S. Pat. No. 3,924,062, issued Dec. 2, 1975;

"Video Disc Player" by James E. Elliott, U.S. Pat. No. 3,829,662, issued Aug. 13, 1974;

"Video Disc Player" by James E. Elliott, U.S. Pat. No. 3,914,541, issued Oct. 21, 1975; "Reading Head for Video Disc Player" by Manfred H. Jarsen, U.S. Pat. No. 3,947,888, issued Mar. 30, 1976;

"Method of Creating a Replicating Matrix" by Norma Abigania Avanzado and Manfred H. Jarsen, U.S. Pat. No. 3,954,469, issued May 4, 1976;

"Head Height Control System" by Lawrence S. Canino, U.S. Pat. No. 3,894,180, issued July 8, 1975;

"Video Recording and Reproducing System" by Kent D. Broadbent, U.S. Pat. No. 3,908,080 issued Sept. 23, 1975;

"Video Recording and Reproducing System" by Kent. D. Broadbent, U.S. Pat. No. 3,908,076, issued Sept. 23, 1975;

"Video Disc Player" by James E. Elliott, U.S. Pat. No. 3,944,727, issued Mar. 16, 1976.

Pending Patent Applications

"Video Record Disc and Process for Making Same" by David P. Gregg, Ser. No. 735,007, filed June 6, 1968, which was continued as Ser. No. 571,259, filed Apr. 24, 1975.

"Drop-Out Compensator" by Wayne Ray Dakin, Ser. No. 299,891, filed Oct. 24, 1972;

"Video Disc Mastering System" by John S. Winslow, Ser. No. 333,560, filed Feb. 20, 1973 which was continued as Ser. No. 508,815 filed Sept. 24, 1974 which in turn was continued as Ser. No. 714,133, filed Aug. 13, 1976.

"Fluid Cushion Turntable for Video Disc Player" by Manfred H. Jarsen, Ser. No. 402,634, filed Oct. 1, 1973;

"Method of Creating a Replicating Matrix and the Matrix Created Thereby" Manfred H. Jarsen, Ser. No. 402,636, filed Oct. 1, 1973;

"Replication Utilizing a Casting Process" by Manfred H. Jarsen, Ser. No. 406,686, filed Oct. 15, 1973;

"Video Recording and Reproducing System" by Kent D. Broadbent, Ser. No. 437,604, filed Jan. 28, 1974, which has been abandoned;

"Focusing System for Videodisc Player" by James E. Elliott, Ser. No. 454,130, filed Mar. 25, 1974;

"Video Disc Read Back Scanner" by James E. Elliott, Ser. No. 662,238, filed Feb. 27, 1976.

BACKGROUND OF THE INVENTION

1. Field of the Invention

This invention relates to a light transducer and, more particularly, to an automatic servo-positioning system for positioning a scanning beam for use in a videodisc player.

2. Description of the Prior Art

In the sensing of information recorded on a disc, such as a videodisc for use in a videodisc player, positioning of the read beam in relation to a preselected spot on the track being read is quite critical. Deviation from the center may cause the output of the returned beam to be distorted or at too low a level to be sensed.

A videodisc will have information prerecorded in concentric circular or spiral tracks with a $2\mu$ radial distance between adjacent tracks with a track width of $1\mu$. In order to follow this track with a disc rotating at 1800 rpm, it is an absolute necessity that the read beam be always accurately positioned over the data track being read.

The prior art has attempted to cope with this problem in a variety of ways. Open loop methods have been used wherein the positioning of a read head was mechanically set and subsequently readjusted. Closed loop systems have also been employed where separate positioning tracks were recorded coincidentally with the data tracks. Specially grooved record discs have also been used wherein the read-recording head was positioned by virtue of its spatial relation to the groove.

In U.S. Pat. No. 3,126,535, to Streeter, a system for tracking magnetic discs was disclosed in which a small transverse oscillatory motion was applied to the magnetic transducer after it has been positioned in the general area of a data track. The oscillating motion of the transducer causes an amplitude modulation of the magnetically recorded signals being read.

The phase of the output signal relative to the phase of the oscillatory motion is dependent upon the relative positioning of the transducer and the recorded track. This provides the necessary indication as to whether the transducer is positioned at its optimum sensing point.

The magnetic head, therefore, is responsive to the aforementioned phase relationship, for changing its position in a direction such as to center it over the track.

As is well known, magnetic discs are generally provided with circular information tracks of a width, orders of magnitude greater than the one micron track employed on the video disc. Further, the mass and inertia of the magnetic head system precludes the use of the approximately 1 kHz oscillating frequency that would be desirable in tracking a videodisc channel.

Further, and in contrast to magnetic recording systems, the videodisc system provides a signal whose average value is at a minimum when the reading beam tracks the center of the information channel. This requires a mechanization that is fundamentally different from that taught by Streeter, supra.

SUMMARY OF THE INVENTION

In accordance with one embodiment of the present invention, a system is provided for use in a videodisc player to sense deviations of the scanning beam from the videodisc track being scanned, to thereby provide error signals in direction and magnitude suitable to compensate for such variations.

The system essentially scans a row of surface discontinuities which may be "bumps" or "holes" constituting the track of the disc and senses the variations in the return beam intensity when the scanning beams deviates from the center line of the track being scanned. An articulated mirror in the optical path directs the beam from the source to the disc and returns reflected light to a detector. In this manner, variations in the light beam intensity can be used to determine the beam position relative to the track center.

One system of the invention for measuring variations in the returned light intensity includes a photocell positioned in the optical path of the reflected light beam. The path includes an articulated mirror that controls the position of the light spot on the disc. An oscillator drives the articulated mirror to cause the spot to traverse the information tracks with a lateral excursion of approximately 0.3 micron. The signal output of the photocell then includes error magnitude information in addition to error "direction" information which is determined by the phase relationship between the reflected light and the drive signal to the articulate mirror.

The system is arranged such that if the beam is accurately centered, the average intensity signal is at a minimum. If the error detected is to the right, the intensity signal increases and, when multiplied by the driving signal, produces a product that has, for example, a positive value, whereas if the error is to the left, the product has an opposite or negative value. Therefore, the direction of correction required is represented by the polarity of the multiplied signal while the amount of correction is represented by the average magnitude of the error signal.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 2 is an enlarged fragmentary perspective view of the videodisc track, illustrating information holes to be scanned by the light beam;

FIG. 3 is a graph of intensity of returned illumination as a function of beam position with respect to the track center;

FIG. 4 including FIGS. 4a, 4b and 4c are graphic representations of beam locations with respect to the track;

FIG. 5 is a graphical representation of the resultant product frequency when the beam is centered on the track;

FIG. 6 is a graphical representation of the resultant product frequency when the beam deviates to one side of the center line of the track; and FIG. 7 is a graphical representation of the resultant product frequency when the beam deviates to the other side of the center line of the track.

DESCRIPTION OF THE PREFERRED EMBODIMENTS

Figure 1:
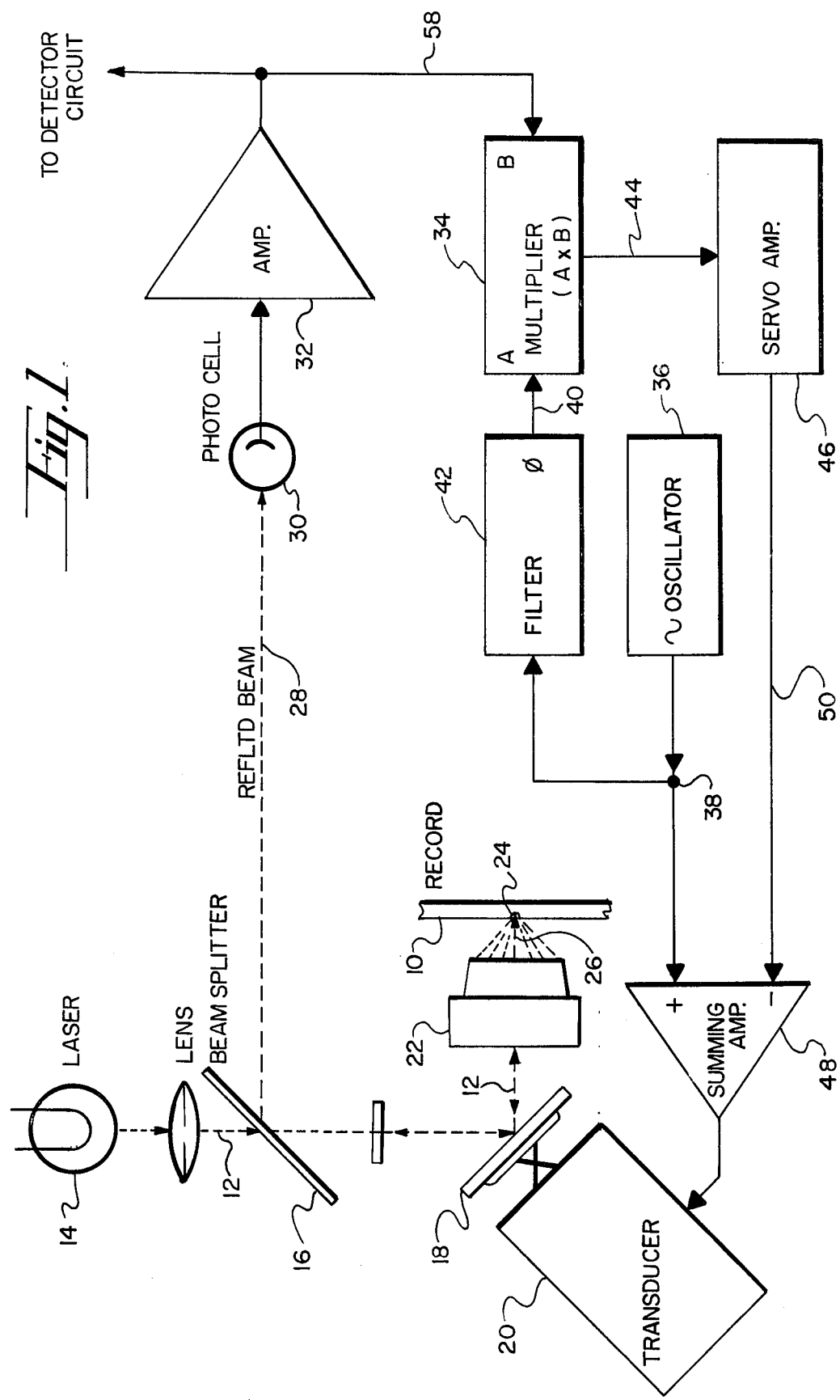
FIG. 1 is a simplified block diagram of a synchronous detection tracking system for a videodisc player constructed in accordance with the invention.

Referring now to the drawings in which like reference numerals index like parts and with attention initially directed to FIG. 1, there is shown a videodisc player which includes a videodisc 10 carried by a motor-driven turntable (not shown). The surface of the disc 10 has, arranged in substantially circular or spiral tracks, information representing picture and sound in the form of a series of surface discontinuities.

The recorded information is read out by directing a light beam 12 along an optical path from a light source 14, such as a laser, through a beam splitter 16 and onto a movable beam-deflecting mirror 18 of a tracking transducer 20. From the mirror 18, the beam 12 is directed to an objective lens 22 and thence onto an information track consisting of a series of holes or bumps 24, one of which is shown in FIG. 1, in the surface of the videodisc 10.

The moving track is laterally scanned in the radial direction by the light beam 26 as a result of an oscillating signal which is applied to the transducer 20. Light reflected from the surface of the disc 10, at the point where the spot of the beam 26 is incident, is gathered by the objective lens 22 which returns the beam towards the beam splitter 16 via the beam-deflecting mirror 18. Suitable polarizing elements (not shown) prevent reflected light from penetrating the beam splitter 16.

The beam splitter 16 directs the reflected light beam 28 towards a photocell 30. A signal from the photocell 30 is delivered to a processing circuit, as will hereinafter be explained. The surface of the videodisc 10 is configured to cause modulation in the character of the reflected radiation beam, which modulation is recognized and converted into useful information in the processing circuits after detection at detector 30.

Thus, it is important to make sure that the incident spot 26 is accurately positioned with respect to the surface of disc 10, for instance, to insure that the series information-carrying discontinuities on the disc is fully and properly illuminated by the incident beam 26, and to assure that the reflected or returned beam is properly transmitted to the photocell 30. Thus, the photocell is employed as a position detector unit to determine when, and by how much, the mirror 18 must be driven to maintain proper alignment with the center of the information-bearing track.

The output of photocell 30 is delivered to the processing circuit which ultimately generates a correcting error signal which is delivered to the transducer 20 which moves the mirror 18 such that the total optical system restores the point of impingement in accordance with the direction and magnitude error information carried by the reflected beam 28 and detected by photocell 30.

The mirror 18, transducer 20, and objective lens 22, as well as the beam splitter 16, photocell 30 and the processing circuit to be described, may be located in a single housing, not shown, constituting a tracking unit. The unit may be movable towards and away from the center of the disc so as to follow the information track, if a spiral, or to proceed from track to track if information is stored in a plurality of concentric circles. In this way, light from the source 14 is always brought to a predetermined focus at the surface of the disc 10, so that information recorded at high density thereon can be accurately read out.

The beam may be polarized so that beam splitter 16 directs almost all of the reflected beam along a second direction which is out of line with the light source 14. The reflected beam 28 passes through the cell 30, and its output is applied to an amplifier 32. The output of the amplifier is delivered to a multiplier 34.

The track, as hereinbefore explained, consists of a row of surface discontinuities, such as bumps or holes 24. These discontinuities modulate the intensity of the light or radiant beam 26 as the recorded surface of the disc 10 moves past the beam in the direction of the linear track. The average intensity of the reflected light is at a minimum in the center of the track of holes or bumps and increases to a maximum on either side of the row as the substantially planar surface area separating the rows is encountered.

As oscillator 36 applies a sinusoidal signal to the transducer 20, thereby causing an oscillation of the mirror 18 and an oscillation of the scanning beam transverse to the direction of surface motion. In other words, the light beam is "dithered" from side to side with respect to the track. As more of the planar area between the tracks is included in the scan, the average magnitude of the signal is increased. Minimum intensity is obtained when the beam is exactly centered.

An error signal adequate to indicate deviation of the beam from the center of the track must contain information regarding both the magnitude and the direction of error involved, whereas the average intensity of the reflected beam contains only magnitude information.

In order to determine the direction of error of the correcting signal when the beam deviates from the center of the track, as oscillating signal 30 from the oscillator 36 is applied to the transducer 20 via a summing junction 38 and causes the beam to oscillate by approximately one-third of the width of the track. The reflected light beam now has, in addition to error magnitude information represented by average intensity of the reflected signal, error direction information, which is determined by the phase relationship between the reflected light signal and the oscillating drive signal.

A suitable error signal is derived by multiplying the received or reflected light signal output of the photocell 30 by the drive signal 40 of oscillator 36 in multiplier 34. A phase filter 42 provides a fixed correction of the phase of the oscillator 36 output. When, in the center of the track, the signal product tends to average toward zero, as illustrated in FIG. 5, the mean value of this signal is considered positive on one side of the channel, as in FIG. 6, and negative on the other side, as in FIG. 7.

The resultant product of the drive signal and the detected return signal 58 results in correction signal 44, such as is shown in FIGS. 5, 6 and 7, which is applied to the transducer 20 via servo amplifier 46 and summing amplifier 48.

The average intensity level error signal is used to generate a correction signal whenever the light beam deviates from the center line of the track. The correction signal, combined with the oscillator output, is applied to the transducer 20 which carries the mirror 18, the latter being operable to deflect the light beam 12 in accordance with the correction signal.

Turning next to FIG. 2, there is shown a fragmentary portion of the surface of a disc 10 in which surface discontinuities, here shown as holes 24, are arranged in a concentric track or channel which, in one embodiment, is arranged in a spiral. Although holes 24 are illustrated, illustrated portions, such as "bumps," are equally feasible and have been employed in some videodisc embodiments. Generally, each hole 24 or bump is approximately one micron in diameter and approximately one micron deep. The space between adjacent holes is generally equal to the length of the adjacent holes. The holes can range in length from less than one micron to approximately 1.5 microns.

FIG. 3 is a graph illustrating the relative intensity of the returned light beam 28 as a function of radial or lateral displacement from the center line $d$ of an information channel. As shown in FIG. 3, the average intensity is at a minimum when tracking the center of the channel, rising rapidly to a maximum as more of the surrounding, highly reflective surface area is included in the scanning beam.

FIG. 4 illustrates three exemplary situations of the reading beam 26 tracking the spots 24 comprising an information channel. The center line of the beam is indicated by the line 26, and the limits of beam excursion, while dithering under the control of the signal from the oscillator 36, are indicated by the dotted lines $50^+$, $50^-$. In FIG. 4a, the reading beam 26 is tracking the center of the information channel. In FIG. 4b, the beam 26 is tracking off-center on one side of the channel, and in FIG. 4c, the beam 26 is tracking off-center but on the opposite side of the channel.

Turning next to FIGS. 5, 6 and 7, there is graphically illustrated a simplified resulting output signal of multiplier 34, respectively corresponding to the conditions illustrated in FIGS. 4a, 4b and 4c. As shown in FIG. 5, the output signal has an average value of 0, since "positive" excursions equal "negative" excursions. The waveforms shown are intended to approximate the actual signals but have been simplified for ease in explanation.

In FIG. 6, the output signal represents the spot center tracking the left side of the information channel as viewed in the figure. The phase filter 42 has been adjusted initially so that the resultant signal is relatively positive, as illustrated. Similarly, for the situation illustrated in FIG. 4c wherein the beam tracks the right side of the information channel, the resultant output signal, as illustrated in FIG. 7, is relatively negative.

The servo amplifier 46 and the summing amplifier 48 provide an output signal in the transducer which shifts the effective center point of impingement of the scanning beam 26 by adding a bias to the oscillating signal. Further, tne error signal from the servo amplifier 46 can also be applied to appropriate tracking circuits, such as are illustrated in the above-identified applications of Elliott, supra. Such error signal could be used to either drive a lead screw or other relatively gross follower mechanism to keep the reading head in useful proximity to the information channel at the different radial locations.

Other embodiments of the present invention and modifications of the embodiments presented herein may be developed without departing from the essential characteristics thereof. Accordingly, the invention should be limited only by the scope of the claims appended below.

What is claimed as new is:

1. Circuit means for generating a tracking error signal for biasing the scanning motion of a beam of light in a servo system of the type wherein the beam of light is focused to a spot and the spot of light is used to optically track and simultaneously read a channel of information stored on a video disc, the video disc having a sequence of bumps alternating with the planar surface portion of the video disc for causing a reflective-scattering sequence of the spot as it runs along the track, the system having means for rapidly scanning the spot of light across the information channel and having means for collecting and detecting the light reflected from the video disc, said circuit means comprising:

an oscillator for generating a driving signal to the means for scanning to produce an oscillatory scan pattern;

a phase filter coupled to said oscillator for shifting by a fixed amount the phase of the driving signal generated by said oscillator to substantially match the phase of the oscillatory scan pattern;

multiplier means for combining the phase-shifted oscillator signal with the output of the means for detecting to effect a linear multiplication of the two applied signals and thereby produce a multiplier output signal whose polarity represents the direction of the deviation of said scan pattern relative to the information channel and whose average magnitude is proportional to the magnitude of the displacement of said scan pattern from the center of the information track, the minimum magnitude occurring when the spot is centered in the tracks; and a summing amplifier in which the driving signal generated by said oscillator is combined with the output of said multiplier means for driving the means for scanning.

2. In a data handling system, the improvement for simultaneously reading and tracking a channel of information, comprising:

an information storage member having a planar information storage surface carrying a sequence of bumps alternating with planar surface portions and arranged in an information channel;

means for producing a light beam and focusing said beam onto a spot;

movable mirror means for directing said spot onto the information channel carried by said information storage means, said light spot being reflected from said planar surface portions of said information channel and said light spot being scattered by said bumps of said information channel;

means for rapidly scanning said spot of light across said information channel;

means for collecting said light that is reflected from said information bearing surface and for producing a corresponding output signal representing the information stored in said information channel;

an oscillator for generating a driving signal to said scanning means for producing an oscillatory scan pattern;

a phase filter coupled to said oscillator for shifting by a fixed amount the phase of the driving signal generated by said oscillator to substantially match the phase of the oscillatory scan pattern;

multiplier means for combining the phase-shifted oscillator signal with the output of the means for producing to effect a linear multiplication of the two applied signals and thereby produce a multiplier output signal whose polarity represents the direction of the deviation of said scan pattern relative to the information channel and whose average magnitude is proportional to the magnitude of the displacement of said scan pattern from the center of the information channel, the minimum magnitude occurring when the spot is centered in the channel; and a summing amplifier in which the driving signal generated by said oscillator is combined with the output of said multiplier means for driving the means for scanning.

* * * * *